Jan. 10, 1928.

H. T. GRISWOLD

PASTE JAR

Filed Feb. 1, 1923

1,655,950

Inventor.
Harold T. Griswold,
By Nissen & Crane
Attys.

Witness:
Dare S. Magnusson.

Patented Jan. 10, 1928.

1,655,950

UNITED STATES PATENT OFFICE.

HAROLD T. GRISWOLD, OF CHICAGO, ILLINOIS, ASSIGNOR TO SANFORD MANUFACTURING CO., OF CHICAGO, ILLINOIS, A CORPORATION OF ILLINOIS.

PASTE JAR.

Application filed February 1, 1923. Serial No. 616,237.

My invention relates to paste jar constructions and has for one of its objects the provision of a simple and efficient paste jar arrangement suitable for storing and shipping adhesives of liquid or semi-liquid consistencies.

A further object is the provision of a simple and efficient means for packing a paste brush in the jar with the paste and maintaining it separated from such paste.

A further object is the provision of a paste jar construction with simple and efficient means for sealing the joint between the jar and cover.

A still further object is the provision of simple and efficient means for adjustably mounting a paste brush in a jar.

Other objects will appear hereinafter.

An embodiment of my invention is illustrated in the accompanying drawing, forming a part of this specification, and in which—

Fig. 1 is a central sectional view with a portion in elevation showing my improved paste jar;

Fig. 2 is a central section of the same with portions of the device removed;

Fig. 3 is a section taken on line 3—3 of Fig. 4; and

Fig. 4 is a section taken on line 4—4 of Fig. 2.

Referring more particularly to the drawing, I have indicated a paste jar 5 of glass and with a conical outer shape. It will be understood that any suitable material and configuration may be given the jar 5. At the upper end of the jar or bottle 5 is a neck 6 having an opening in its top and an integral spiral bead 7 on its outer side providing a screw thread adapted to engage the groove formed by a spiral bead 8 formed in a cap 9 for the bottle. With this arrangement the cap 9 may be attached to the neck 6 by engaging the threads 7 and 8. This arrangement also provides a detachable connection between the cover 9 and bottle 5.

Extending upwardly from the cover 9 is a hollow projection or dome 10. The cover 9 and extension 10 are preferably of thin sheet metal but may be formed of any desirable substance. I have shown the part 10 as being fitted rigidly to an opening in cap 9 but it will be understood that the extension 10 may be attached to the cover 9 in any desirable manner.

The hollow part of extension 10 provides a housing for the upper part of a paste brush 11 which extends downwardly into the bottle 5. Lying on the top of neck 6 is a disc 12 which may be of cork or any other desirable substance and provides a gasket for sealing the joint between the cap 9 and the bottle 5. The central part of disc 12 is perforated and a well or tubular member 13 extended through said perforation and down into the interior of the bottle or jar 5 so as to provide a well for the bottom of brush 11. The tubular member 13 may be formed of glass, paraffined paper, or any other desirable substance impervious to the adhesive mixture in the jar. The member 13 may be attached to the disc 12 in any desirable manner, such as by providing an integral flange 14 at the top of the member 13 which rests on the upper side of the disc 12 around the perforation therein. The joint between the disc 12 and the member 13 may be formed tight so as to prevent the passage of the adhesive into the tube 13, or the joint between the disc 12 and tube 13 may be provided with a coat of paraffine or some other suitable material to seal the joint and prevent the adhesive from coming in contact with the brush 11.

A disc 15 preferably of metal is positioned above the disc 12 and provided with an annular flange of metal 16 around a central opening with a plurality of parts cut out forming tongues or springs 17 which are adapted to frictionally engage the sides of the handle of brush 11 to hold the latter in a manner to permit such brush being adjusted to different heights so that the bristles of the brush may be held at a desired height in the adhesive material in jar 5. These tongues 17 provide frictional means so that the brush can be moved upwardly or downwardly very easily and yet be held firmly in desired positions. The disc 15 is further provided with a depending annular metal bead 18 which provides a spacing member for holding the disc 15 centrally of the opening in neck 6 when the cover is removed from the bottle.

When the disc 12 is in position such as indicated in Fig. 1, additional clearance for the bead 18 may be provided by an annular spacing washer 19 which may also be provided of cork, rubber, or other material to facilitate making a tight joint. This washer 19 may be dispensed with, however, when so desired.

The arrangement shown has a decided advantage in that the brush 11 can be packed within the jar and kept from coming in actual contact with the adhesive until it is desired to use the latter. Where the brush is shipped outside or separate from the jar such brush might become lost in shipment or storage, while when packed as shown herein, the brush is always in the bottle ready for use and with the particular arrangement can be kept from coming in contact with the adhesive until the latter is to be used. The disc 12 and tubular well 13, as indicated above, are formed of materials impervious to the adhesive so as to protect the brush while being shipped, packed, stored, or waiting on the shelves of a retail merchant for the final user. When the adhesive is to be used the cap 9 with the dome 10 attached is unscrewed and disc 15 removed together with the brush 11. The tube 13 and disc 12 are then removed and may be discarded if desired. The disc 15 with the brush 11 attached is then placed in the position indicated in Fig. 2 and cap 9 adjusted to its position. This permits the brush to dip into the adhesive in jar 5 and the brush can be adjusted to different levels by simply moving the latter up and down against the pressure exerted by springs 17. This device is particularly adapted for use in connection with liquid adhesives, such as mucilage or liquid paste. It is important to keep the brush out of the adhesive until the latter is to be used for the reason that the moisture of the adhesive causes the brush to deteriorate and render it unfit for use. The provision of the well for the brush until the latter is to be used in the adhesive is an important feature of this improvement. The device is also very compact in that the brush is packed in the jar and therefore cannot easily become lost or injured.

During shipments the liquid paste is sealed in the bottle or jar while the brush is confined in a very compact manner to a dry space effectually sealed from the liquid paste compartment. When the cap 9 is removed the dome 10 is also removed since the latter is permanently secured to the cap 9. Preferably, when the bottle or jar filled with liquid paste is to be shipped the parts are arranged as shown in Fig. 1, but in the event that the brushes are shipped separately the tube 13 may be omitted and the disc 12 provided without a central perforation so that when the parts are assembled the dome will be sealed from the paste compartment by the cap 9 being drawn by the thread 7 against the peripheral edge of the disc 12. It is also preferred to use the centering bead 18 constructed as shown in Fig. 3, but if this is omitted the washer 19 may also be omitted since this washer is a spacer for the centering bead 18, as shown in Fig. 1. The simplicity of the construction in use is illustrated in Fig. 2 because the inner plate cover 15 may be drawn against the neck of the bottle by screwing down the cap 9 whenever desired, thus effectually maintaining the proper consistency of the liquid paste by preventing evaporation. Furthermore, the circular cover plate 15 also has the function of holding the brush to the proper height and this may be regulated by moving the brush handle either up or down against the friction of the spring clips 17.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. A paste jar comprising a bottle having an open mouth, a cover fitting over the upper edges of said open mouth to serve as a closure for said bottle, a brush extending through a perforation in said cover, resilient members on said cover for engaging the brush to support the latter at adjusted elevation in said bottle, and an outer cover having a clamping connection with said bottle in position to engage the peripheral edge of said first-named cover and clamp the same against the upper edges of said mouth.

2. A paste jar comprising a bottle having an open mouth, a flat closure with its peripheral edge fitting the upper edge of said mouth, a brush extending through a perforation in said closure, resilient members on said closure to engage said brush to suspend the same from said closure at an adjusted elevation in said bottle, and a cap screw-threaded to said bottle over the mouth thereof in position to engage the peripheral edge of said closure and clamp the same firmly against the upper edge of said bottle mouth.

3. In combination, a bottle having an open mouth, a closure with its peripheral edge adapted to fit the upper edge of the open mouth of the bottle, a brush extending through an opening in said closure, resilient members on said closure for engaging the handle of the brush to support the latter at adjusted elevation in the bottle, a gasket adapted to fit between the upper edge of the bottle and the lower peripheral edge of said closure, and a brush receptacle suspended from said gasket into the bottle to receive the brush and partition it from the contents of the bottle during transportation, said gasket and said brush receptacle being removable from the bottle to permit said closure to fit the upper edge of said bottle mouth.

4. In combination, a bottle having an open mouth, a perforated covering for the mouth of said bottle, a brush extending through said perforation; resilient members on the covering engaging the brush, a cap disposed over said brush and covering and clamping the latter to said bottle, and a gasket between said covering and the top of said bottle.

5. A paste jar comprising a bottle having an open mouth, a covering for said mouth, a brush having its handle extending through said covering, a cap disposed over the brush handle, a gasket between said covering and the upper edge of the mouth of the bottle, a receptacle suspended from said gasket and extending below said covering to receive that portion of the brush below said covering, and means for clamping said cap against the peripheral edge of said covering with the peripheral edge of the gasket at the upper edge of said mouth.

6. In combination, a bottle having an open mouth, a disc-shaped gasket with its peripheral edge adapted to rest on the upper edge of the open mouth of the bottle, a tubular vessel closed at its lower end and open at its upper end and extending through a perforation in said gasket for suspension by the latter in the bottle, said tubular vessel being adapted to receive a brush and co-act with said gasket to form a partition to keep said brush out of contact with the contents of the bottle during transportation, a cap to serve as a closure for the open mouth of the bottle, and means for clamping the cap to the bottle and causing the peripheral edge of the gasket to be pressed against the upper edge of the bottle.

7. In combination, a jar having an open mouth, a gasket for the upper edge of the open mouth, a tubular vessel extending through said opening in said gasket, an annular flange at the upper end of said tubular vessel in position to engage the gasket to suspend the tubular vessel in the jar, a cap to serve as a closure for the jar, and means for clamping the cap to the jar and clamping said gasket against the upper edge of said mouth.

8. In combination, a bottle having an open mouth, a disc-shaped gasket over the mouth of the bottle and having a central perforation, a receptacle disposed in said perforation and extending down into said bottle, a disc over said gasket and having a central perforation, and a brush adjustably mounted in the last-mentioned perforation and disposed in the receptacle attached to the gasket.

9. In combination, a jar having an open mouth, a gasket for the upper edge of the open mouth, a receptacle extending through a perforation in said gasket, the lower end of said receptacle being closed and the upper end being open to adapt the same to receive a brush and keep the same out of contact with the contents of said jar, a covering with its peripheral edge on the peripheral edge of said gasket, a brush having its handle extending through an opening in said covering with the lower portion of said brush extending into said receptacle, and a cap fitting over the mouth of the jar and engaging the upper peripheral edge of said covering.

10. In combination a gasket for the upper edge of the open mouth of a jar adapted to contain liquid, and a brush protecting receptacle having its lower end closed and its upper end open and extending through an opening in said gasket and adapted to be suspended by the latter in the jar below the open mouth thereof.

11. In combination, a disc-shaped gasket having a central perforation, the peripheral edge of said gasket being adapted to rest on the upper edge of the open mouth of a jar, a brush protecting receptacle with its lower end closed and its upper end open, and a flange extending around the open upper end of the receptacle for suspending the latter from said gasket in the jar below the open mouth thereof.

12. In combination, a cork disc with its peripheral edge adapted to rest on the upper edge of the open mouth of the jar, a glass brush protecting receptacle with its lower end closed and its upper end open, said receptacle extending through a central opening in said cork disc, and a flange around the upper end of the said glass receptacle for engaging the upper surface of said cork disc to suspend the glass receptacle in said jar.

13. In combination, a jar having an open mouth, a cover disposed over the upper edges of said mouth, a brush extending through the perforation in said cover, resilient members mounted on said cover engaging the brush frictionally to hold the latter at adjusted elevation, and an outer cover having a dome to receive the handle of the brush when the latter is suspended by said resilient members from said first-named cover.

14. In combination, a jar having an open mouth, a disc disposed over the mouth of the jar with its peripheral edge fitting the upper edge of said mouth, a brush extending through an opening in the center of said disc, spring tongues on said disc at said opening for engaging the brush to suspend the same from said disc at an adjusted elevation in the jar, a cap adapted to fit over said mouth and engage the peripheral edge of said disc.

and means for clamping said cap to the jar to firmly hold the peripheral edge of said disc against the upper edge of said mouth.

15. In combination, a jar having an open mouth at its top, a flat plate closure for the open mouth of said jar with the peripheral edge of said plate adapted to fit the upper edge of said open mouth, a brush having its handle extending through a perforation in said plate closure, resilient clips attached to said plate closure and frictionally engaging the brush handle to support the latter at adjusted elevation in the bottle, an outer cover disposed over the brush handle and adapted to engage the peripheral edge of said plate closure, and a screw-threaded connection between said outer cover and the mouth of said jar to clamp the peripheral edge of said plate closure against the upper edge of said mouth while said brush is held at adjusted elevation in said bottle.

16. A closure for paste jars comprising a disc having a flat peripheral edge and having an opening extending through the center thereof to receive a brush handle, said disc and the brush handle in said opening serving as a complete closure for the paste jar when said peripheral edge of said disc fits the peripheral edge of the opening in the jar, resilient means in position at the opening in the disc to engage the brush handle and hold the same at adjusted elevation, an outer covering for completely enclosing said disc and said brush handle, and means for clamping the outer cover to the jar with the peripheral edge of said discs on the upper edge of the opening in the jar.

17. A closure for paste jars comprising a cover having an opening extending therethrough, centering means on the bottom of said cover, and resilient means associated with said opening in position to engage the brush handle to hold the same in adjusted relation to said cover.

18. A closure for paste bottles comprising a cap, a brush holder fitting the mouth of the bottle to serve as a cover therefor, and a removable partition below said cover and comprising a gasket with a brush receiving receptacle suspended therefrom.

19. In combination, a closure for paste bottles, and a removable partition comprising a gasket for the upper edge of the mouth of the bottle with a brush receiving receptacle connected thereto and extending into the liquid in the jar while serving to prevent the brush from coming in contact with such liquid.

20. In combination, a removable partition adapted to be connected to the upper edge of the open mouth of a bottle, said partition extending down into the bottle and serving to receive a brush while keeping it out of contact with such liquid in the jar, and a closure for the mouth of the jar constructed to hold the said partition at the upper edge of the mouth of said jar to seal the liquid in the jar from the brush.

21. In a paste jar, the combination with a jar having an opening into it, of a brush holder serving as a closure for said opening, removable means adapted to fit between said closure and said opening to form a partition between the compartment in said jar and the opening thereinto, a cap having a dome in position for the brush handle to extend thereinto from the brush holder, and means for clamping said cap and dome over the said opening with the brush holder closure in position above said partition.

22. A brush holder for paste jars comprising a flat disc closure adapted to fit over the open mouth of the paste jar and engage the upper edge thereof, said closure having an opening therethrough into which is adapted to fit the handle of a brush, means comprising resilient members at such opening in position to engage the brush handle frictionally to suspend the brush at adjusted elevation in the paste jar, an outer cover adapted to fit over the mouth of the paste jar and engage the peripheral edge of said flat disc closure, and clamping means for forcing the outer cover against the peripheral edge of said flat disc closure to hold the latter firmly against the upper edge of the mouth of the paste jar.

23. A closure for paste jars comprising a brush holder adapted to fit over the mouth of the paste jar, centering means on the bottom of said brush holder adapted to engage the inner edges of the mouth of the jar when said brush holder is moved laterally, and metallic frictional means for holding a brush in said brush holder with the brush in adjusted position.

24. A closure for paste jars comprising a brush holder adapted to serve as a cover, centering means on the bottom of said brush holder, means for holding the brush in said brush holder in adjusted position, a cap having a dome adapted to have the brush handle extending thereinto when in position in said brush holder, means separate from said brush holder for dividing the brush holder compartment from the paste compartment, a washer between the peripheral portion of the brush holder and the peripheral portion of said dividing means to serve as a spacer for said centering means when in position above said dividing means, and means for clamping the cap onto the neck of a bottle and simultaneously therewith clamping said washer and said dividing means securely in position for transportation.

25. A closure for paste jars comprising a cover, a brush holder, said cover having a dome adapted to receive the handle of a brush when mounted in said brush holder, and a removable partition connected to and suspended from the opening in said paste jar, said partition being adapted to separate the paste compartment from said dome and said brush holder when the said cover closes the paste jar.

26. A closure for paste jars comprising a cover, a brush holder having its peripheral edge fitting the upper edge of the open mouth of the jar, a removable partition connected to and suspended from the upper edge of the mouth of the jar and adapted to separate the paste compartment from the brush holder and the inside of said cover, and screw-threaded connections between said cover and the mouth of said jar to clamp the peripheral edge of said brush holder against the peripheral edge of said partition and clamp the peripheral edge of said partition against the upper edge of the open mouth of said bottle.

In testimony whereof I have signed my name to this specification on this 27th day of January, A. D. 1923.

HAROLD T. GRISWOLD.